United States Patent
Chou et al.

(10) Patent No.: US 10,944,115 B2
(45) Date of Patent: Mar. 9, 2021

(54) CATHODE LAYER AND MEMBRANE ELECTRODE ASSEMBLY OF SOLID OXIDE FUEL CELL

(71) Applicant: Industrial Technology Research Institute, Hsinchu (TW)

(72) Inventors: Tzu-Chi Chou, Hsinchu (TW);
Kuo-Chuang Chiu, Hsinchu (TW);
Tzu-Yu Liu, Taichung (TW);
Yung-Hsiang Juan, Taichung (TW);
Ying-Hao Chu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 163 days.

(21) Appl. No.: 16/255,833

(22) Filed: Jan. 24, 2019

(65) Prior Publication Data
US 2019/0237769 A1    Aug. 1, 2019

Related U.S. Application Data

(60) Provisional application No. 62/622,154, filed on Jan. 26, 2018.

(30) Foreign Application Priority Data

Dec. 12, 2018   (TW) .................................. 107144783

(51) Int. Cl.
*H01M 4/90*    (2006.01)
*H01M 8/1004*  (2016.01)
(Continued)

(52) U.S. Cl.
CPC ....... *H01M 4/9033* (2013.01); *H01M 4/8657* (2013.01); *H01M 8/1004* (2013.01);
(Continued)

(58) Field of Classification Search
CPC ............. H01M 4/9033; H01M 4/8657; H01M 8/1004; H01M 2004/8689; H01M 2008/1293; H01M 2004/028
See application file for complete search history.

(56) References Cited

U.S. PATENT DOCUMENTS 9,209,473 B2    12/2015  Son et al.
2003/0044667 A1  3/2003  Hara et al.
(Continued)

FOREIGN PATENT DOCUMENTS

CN    1520623    8/2004
CN    100449834  1/2009
(Continued)

OTHER PUBLICATIONS

"Office Action of Taiwan Counterpart Application", dated Jul. 9, 2019, pp. 1-8.
(Continued)

*Primary Examiner* — Stewart A Fraser
(74) *Attorney, Agent, or Firm* — JCIPRNET

(57) ABSTRACT

A cathode layer and a membrane electrode assembly of a solid oxide fuel cell are provided. The cathode layer consists of a plurality of perovskite crystal films, and the average change rate of linear thermal expansion coefficients of these perovskite crystal films is about 5% to 40% along the thickness direction. The membrane electrode assembly includes the above-mentioned cathode layer, and the linear thermal expansion coefficients of these perovskite crystal films are reduced towards the solid electrolyte layer of the membrane electrode assembly.

20 Claims, 3 Drawing Sheets

(51) Int. Cl.
*H01M 4/86* (2006.01)
*H01M 8/124* (2016.01)
*H01M 4/02* (2006.01)

(52) U.S. Cl.
CPC ............ *H01M 2004/028* (2013.01); *H01M 2004/8689* (2013.01); *H01M 2008/1293* (2013.01)

(56) References Cited

U.S. PATENT DOCUMENTS

| | | | | |
|---|---|---|---|---|
| 2011/0053046 | A1* | 3/2011 | Gil | H01M 8/1286 429/497 |
| 2013/0295484 | A1* | 11/2013 | Seo | H01M 4/9033 429/482 |
| 2015/0004523 | A1* | 1/2015 | Kobayashi | H01M 4/8621 429/482 |
| 2015/0004524 | A1* | 1/2015 | Kobayashi | H01M 8/1213 429/482 |
| 2015/0004525 | A1* | 1/2015 | Kobayashi | H01M 8/0236 429/482 |

FOREIGN PATENT DOCUMENTS

| | | |
|---|---|---|
| CN | 101416334 | 4/2009 |
| CN | 102265441 | 11/2011 |
| CN | 102365777 | 2/2012 |
| CN | 102763261 | 10/2012 |
| CN | 102842722 | 12/2012 |
| CN | 102738495 | 6/2015 |
| CN | 107394213 | 11/2017 |
| TW | I385851 | 2/2013 |
| WO | 2015059166 | 4/2015 |

OTHER PUBLICATIONS

Yanhua Wang, "The Preparation of Sm0.5-xBaxSr0.5Co0.8Fe0.2O3-δ/SDC for Gradient Composite Cathode and Performance Research", Thesis of Master Degree, with English translation thereof, Inner Mongolia University of Science & Technology, Jun. 2011, pp. 1-10.
"Office Action of China Counterpart Application", dated Jul. 3, 2020, p. 1-p. 7.

* cited by examiner

CATHODE LAYER AND MEMBRANE ELECTRODE ASSEMBLY OF SOLID OXIDE FUEL CELL

CROSS-REFERENCE TO RELATED APPLICATION

This application claims the priority benefit of U.S. provisional application Ser. No. 62/622,154, filed on Jan. 26, 2018, and Taiwan application serial no. 107144783, field on Dec. 12, 2018. The entirety of the above-mentioned patent applications are hereby incorporated by reference herein and made a part of this specification.

TECHNICAL FIELD

The disclosure relates to a cathode layer and a membrane electrode assembly (MEA) of a solid oxide fuel cell.

BACKGROUND

A solid oxide fuel cell (SOFC) is a fuel cell that uses solid ceramic materials as an electrolyte. The entire system of the solid oxide fuel cell operates at a temperature between 500° C. and 1,000° C., and it belongs to a high temperature fuel cell. Therefore, the solid oxide fuel cell has excellent fuel flexibility. Selectable fuels include methane, natural gas, city gas, biomass, diesel and other hydrocarbons.

However, in the membrane electrode assembly of the fuel cell, since the solid electrolyte differs greatly from the electrodes (i.e., cathode layer and the anode layer) in terms of thermal expansion coefficient (CTE), the solid electrolyte and the electrodes are easily destroyed and cracked due to the cyclic thermal stress, resulting in an operation failure of the solid oxide fuel cell.

SUMMARY

The cathode layer of the solid oxide fuel cell of the present disclosure consists of a plurality of perovskite crystal films, and the average change rate of linear thermal expansion coefficients of the perovskite crystal films along the thickness direction is about 5% to 40%.

The membrane electrode assembly of the solid oxide fuel cell of the present disclosure includes a cathode layer, an anode layer and a solid electrolyte layer disposed between the cathode layer and the anode layer, wherein the cathode layer consists of the above-mentioned perovskite crystal films, and the linear thermal expansion coefficients of the perovskite crystal films in the cathode layer are reduced towards the solid electrolyte layer.

Various exemplary embodiments accompanied with figures are described in detail below to further describe the disclosure in details.

BRIEF DESCRIPTION OF THE DRAWINGS

The accompanying drawings are included to provide further understanding, and are incorporated in and a part of this specification. The drawings are exemplary embodiments and together with the description, serve to explain the principles of the disclosure.

DETAILED DESCRIPTION

Figure 1:
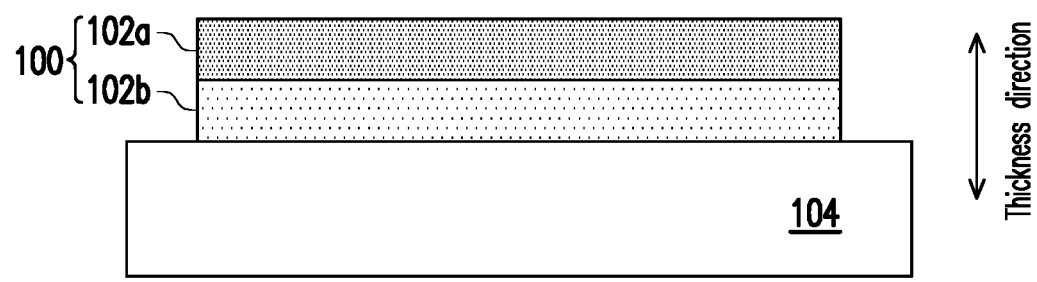
FIG. 1 is a schematic cross-sectional view of a cathode layer of a solid oxide fuel cell in accordance with a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic cross-sectional view of a cathode layer of a solid oxide fuel cell in accordance with a first embodiment of the present disclosure.

Referring to FIG. 1, the cathode layer 100 of the first embodiment consists of a plurality of perovskite crystal films 102a and 102b, and the average change rate of linear thermal expansion coefficients of the perovskite crystal films 102a and 102b along the thickness direction is about 5% to 40%, such as 10% to 35%, 20% to 35%, 10% to 25%, or 10% to 20%. The so-called "average change rate of linear thermal expansion coefficients along the thickness direction" indicates that, if there are N perovskite crystal films, (N−1) change rates of linear thermal expansion coefficients between the two adjacent layers along the thickness direction are obtained, and then the sum of these change rates is divided by (N−1) to obtain the average change rate. The material of the perovskite crystal films 102a and 102b includes, for example but not limited to, LaSrCoFe oxide, LaSrFe oxide or LaSrMn oxide, and the porosity of the perovskite crystal films 102a and 102b may be similar or substantially the same. The perovskite crystal films 102a and 102b may be basically made by the same or different perovskite materials. If perovskite crystal films 102a and 102b are made by the same material, such as LaSrCoFe oxide (e.g., $La_{1-x}Sr_xCo_{1-y}Fe_yO_3$, wherein $0.1 \leq x \leq 0.9$ and $0.3 \leq y \leq 1.0$, or $0.2 \leq x \leq 0.8$ and $0.2 \leq y \leq 1.0$), the linear thermal expansion coefficients thereof can be changed by adjusting the amount of Sr and the amount of Co. For example, by increasing the amount of Sr or Co, a perovskite crystal film material can be provided with a higher linear thermal expansion coefficient. In another embodiment, if the perovskite crystal films 102a and 102b are made by the same material, such as LaSrMn oxide (e.g., $La_{1-z}Sr_zMnO_3$, wherein $0.1 \leq z \leq 0.5$) or LaSrFe oxide (e.g., $La_{1-w}Sr_wFeO_3$, wherein $0.1 \leq w \leq 0.5$), the linear thermal expansion coefficients thereof can be changed by adjusting the amount of Sr. For example, by increasing the amount of Sr, a perovskite crystal film material can be provided with a higher linear thermal expansion coefficient.

In the first embodiment, the perovskite crystal film 102b is in contact with the solid electrolyte layer 104, and the perovskite crystal film 102a is not in contact with the solid electrolyte layer 104, so the linear thermal expansion coefficient of the perovskite crystal film 102b is smaller than the linear thermal expansion coefficient of the perovskite crystal film 102a. For example, the linear thermal expansion coefficient of the uppermost layer (e.g., perovskite crystal film 102a) along the thickness direction is, for example, $1.2 \times 10^{-5}$/K to $2 \times 10^{-5}$/K, or $1.8 \times 10^{-5}$/K to $2 \times 10^{-5}$/K, and the linear thermal expansion coefficient of the lowermost layer (e.g., perovskite crystal film 102b) along the thickness direction is, for example, $9 \times 10^{-6}$/K to $1.5 \times 10^{-5}$/K, or $1.2 \times 10^{-5}$/K to $1.5 \times 10^{-5}$/K, but the disclosure is not limited thereto.

Figure 2:
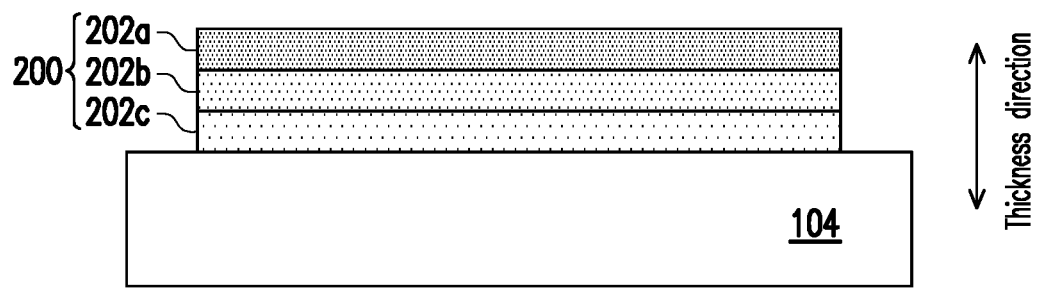
FIG. 2 is a schematic cross-sectional view of a cathode layer of a solid oxide fuel cell in accordance with a second embodiment of the present disclosure.

FIG. 2 is a schematic cross-sectional view of a cathode layer of a solid oxide fuel cell according to a second embodiment of the present disclosure, wherein the reference numbers of the first embodiment are used to denote the same or like components of the second embodiment, reference is made to the description of the first embodiment for the same components, and the details are not iterated herein.

Referring to FIG. 2, the cathode layer 200 of the second embodiment differs from the first embodiment in the number of layers of perovskite crystal films. The perovskite crystal films of the first embodiment include two layers, and the perovskite crystal films of the second embodiment include three layers. Specifically, the perovskite crystal films of the second embodiment include a perovskite crystal film 202a as the uppermost layer along the thickness direction, a perovskite crystal film 202b, and a perovskite crystal film 202c as the lowermost layer along the thickness direction.

The average change rate of the linear thermal expansion coefficients of the perovskite crystal films 202a-c along the thickness direction and the material selection can refer to the first embodiment, wherein the linear thermal expansion coefficient of the uppermost layer (e.g., perovskite crystal film 202a) along the thickness direction is, for example, $1.2 \times 10^{-5}$/K to $2 \times 10^{-5}$/K, or $1.8 \times 10^{-5}$/K to $2 \times 10^{-5}$/K, and the lowermost layer (e.g., perovskite crystal film 202c) along the thickness direction is, for example, $9 \times 10^{-6}$/K to $1.5 \times 10^{-5}$/K, or $1.2 \times 10^{-5}$/K to $1.4 \times 0^{-5}$/K. In the second embodiment, the perovskite crystal film 202c is in contact with the solid electrolyte layer 104, the perovskite crystal films 202b and 202a are not in contact with the solid electrolyte layer 104, and the perovskite crystal films 202b are located between the perovskite crystal films 202a and 202c, so the linear thermal expansion coefficient of the perovskite crystal film 202c is smaller than the linear thermal expansion coefficient of the perovskite crystal film 202b, and the linear thermal expansion coefficient of the perovskite crystal film 202b is smaller than the linear thermal expansion coefficient of the perovskite crystal film 202a. For example, the linear thermal expansion coefficients of two adjacent layers in the perovskite crystal films 202a-c differ by $2 \times 10^{-6}$/K to $5 \times 10^{-6}$/K, but the present disclosure is not limited thereto.

Figure 3:
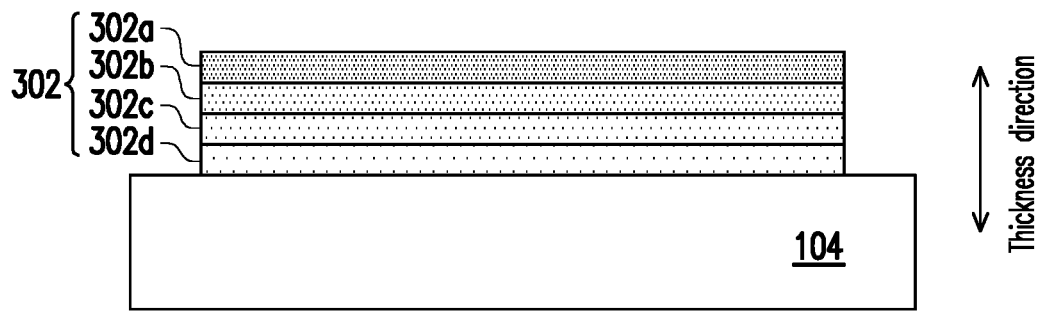
FIG. 3 is a schematic cross-sectional view of a cathode layer of a solid oxide fuel cell in accordance with a third embodiment of the present disclosure.

FIG. 3 is a cross-sectional view of a cathode layer of a solid oxide fuel cell according to a third embodiment of the present disclosure, wherein the reference numbers of the first embodiment are used to denote the same or like components of the third embodiment, reference is made to the description of the first embodiment for the same components, and the details are not iterated herein.

Referring to FIG. 3, the cathode layer 300 of the third embodiment differs from the first embodiment in the number of layers of perovskite crystal films. The perovskite crystal films of the first embodiment include two layers, and the perovskite crystal films of the third embodiment include four layers. Specifically, the perovskite crystal films of the third embodiment include a crystal film 302a as the uppermost layer along the thickness direction, a perovskite crystal film 302b, a perovskite crystal film 302c, and a perovskite crystal film 302d as the lowermost layer along the thickness direction.

The average change rate of the linear thermal expansion coefficients of the perovskite crystal films 302a-d along the thickness direction and the material selection can refer to the first embodiment, wherein the linear thermal expansion coefficient of the uppermost layer (e.g., perovskite crystal film 302a) along the thickness direction is, for example, $1.2 \times 10^{-5}$/K to $2 \times 10^{-5}$/K, or $1.8 \times 10^{-5}$/K to $2 \times 10^{-5}$/K, and the linear thermal expansion coefficient of the lowermost layer (e.g., perovskite crystal film 302d) along the thickness direction is, for example, $9 \times 10^{-6}$/K to $1.5 \times 10^{-5}$/K, or $9 \times 10^{-6}$/K to $1.3 \times 10^{-5}$/K. In the third embodiment, the perovskite crystal film 302d is in contact with the solid electrolyte layer 104, the perovskite crystal films 302a-c are not in contact with the solid electrolyte layer 104, the perovskite crystal film 302c is located between perovskite crystal films 302b and 302d, and the perovskite crystal films 302b is located between the perovskite crystal films 302a and 302c, so the linear thermal expansion coefficient of the perovskite crystal film 302d is smaller than the linear thermal expansion coefficient of the perovskite crystal film 302c, the linear thermal expansion coefficient of the perovskite crystal film 302c is smaller than the linear thermal expansion coefficient of the perovskite crystal film 302b, and the linear thermal expansion coefficient of the perovskite crystal film 302b is smaller than the linear thermal expansion coefficient of the perovskite crystal film 302a. For example, the linear thermal expansion coefficients of two adjacent layers in the perovskite crystal films 302a-d differ by $1 \times 10^{-6}$/K to $4.5 \times 10^{-6}$/K, but the present disclosure is not limited thereto.

Figure 4:
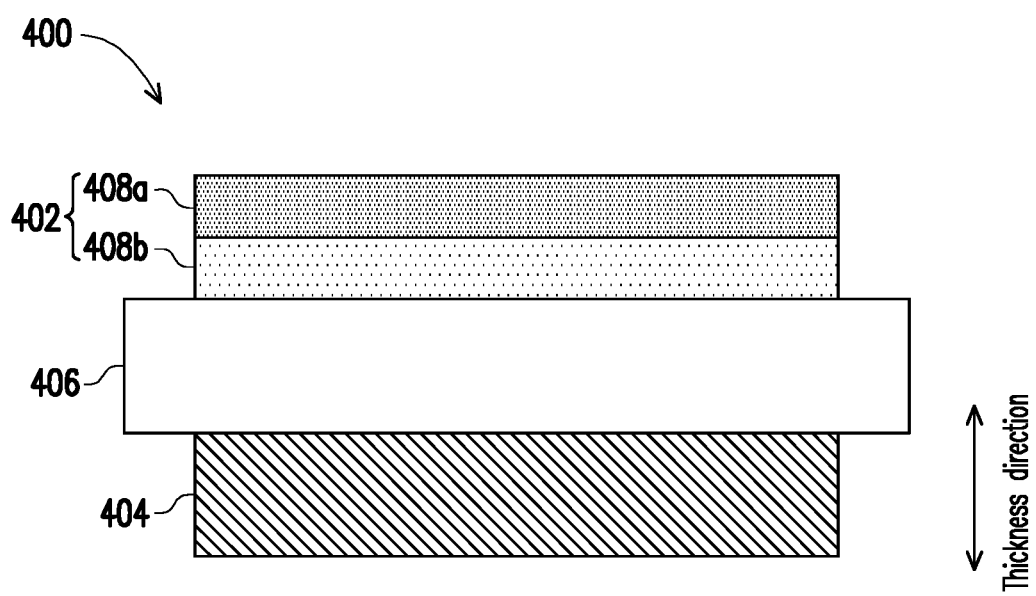
FIG. 4 is a schematic cross-sectional view of a membrane electrode assembly of a solid oxide fuel cell in accordance with a fourth embodiment of the present disclosure.

FIG. 4 is a schematic cross-sectional view of a membrane electrode assembly of a solid oxide fuel cell in accordance with a fourth embodiment of the present disclosure.

Referring to FIG. 4, the membrane electrode assembly 400 of the present embodiment includes a cathode layer 402, an anode layer 404, and a solid electrolyte layer 406 disposed between the cathode layer 402 and the anode layer 404. The cathode layer 402 may be any one of the cathode layers of the first to third embodiments. For example, the cathode layer 402 consists of perovskite crystal films 408a and 408b, and the average change rate of linear thermal expansion coefficients of the perovskite crystal films 408a and 408b along the thickness direction is about 5% to 40%, such as 10% to 35%, 20% to 35%, 10% to 25%, or 10% to 20%. Moreover, the linear thermal expansion coefficients of perovskite crystal films 408a and 408b are reduced towards the solid electrolyte layer 406, such that the linear thermal expansion coefficient of the perovskite crystal film 408b close to the solid electrolyte layer 406 is close to the linear thermal expansion coefficient of the solid electrolyte layer 406, and the linear thermal expansion coefficient of the perovskite crystal film 408a away from the solid electrolyte layer 406 is greater than the linear thermal expansion coefficient of the solid electrolyte layer 406. Such disposition helps to reduce the generation of thermal stress in the membrane electrode assembly 400 and allows the cathode layer 402 to be in direct contact with the solid electrolyte layer 406. For example, in the perovskite crystal films 408a and 408b, the linear thermal expansion coefficient of the outermost layer (e.g., perovskite crystal film 408a) is $1.2 \times 10^{-5}$/K to $2 \times 10^{-5}$/K, and the linear thermal expansion coefficient of the innermost layer (e.g., perovskite crystal film 408b) is $9 \times 10^{-6}$/K to $1.5 \times 10^{-5}$/K. In this embodiment, the material of the solid electrolyte layer 406 may include $ZrO_2$, $CeO_2$, $Bi_2O_3$, $La(Sr)Ga(Mg)O_3$ or a combination thereof. In some embodiments, $ZrO_2$ may include undoped $ZrO_2$, Yttria Stabilized Zirconia (YSZ), $CeO_2$-stabilized $ZrO_2$, $Sc_2O_3$-stabilized $ZrO_2$ or a combination thereof, but the disclosure is not limited thereto. In some embodiments, $CeO_2$ may include undoped $CeO_2$, Sm-doped Ceria, Gd-doped Ceria, or a combination thereof, but the disclosure is not limited thereto. In this embodiment, the material of the anode layer 404 may include nickel oxide and at least one of the material of the solid electrolyte layer, and the material of the solid electrolyte layer is as described above. For example, the anode layer 404 may be Yttria Stabilized Zirconia containing nickel oxide or Sm-doped Ceria containing nickel oxide, but the disclosure is not limited thereto. In addition, the technology currently available for the membrane electrode assembly of a solid oxide fuel cell can also be combined with the cathode layer of the present disclosure having a specific change rate of linear thermal expansion coefficients along the thickness direction.

The experiments are enumerated below to verify the efficacy of the present disclosure, but the present disclosure is not limited to the following.

PREPARATION EXAMPLES 1-6

The disclosure utilized a pulse laser deposition method (PLD) to quickly prepare samples with desired characteristics. Perovskite crystal films with different compositions were deposited on a YSZ substrate, and the steps were as follows.

First, a silver glue was coated on the test piece holder and the YSZ substrate (with a linear thermal expansion coefficient of $9.9 \times 10^{-6}/K$) was placed on top of the test piece holder. The silver glue was completely solidified after the sample was gently pressed and heated, and the sample was then placed in a PLD chamber. Next, the oxygen pressure in the chamber, the laser focal length and the substrate temperature were adjusted to the required conditions, such as a pressure of 80 mTorr to 100 mTorr and a temperature of about 600° C. to 700° C.

Next, according to the number of layers and the corresponding perovskite crystal film materials in Table 1 below, the targets were irradiated by a high-energy laser (double-target experiments: $LaCoO_3$, $LaFeO_3$, $SrCoO_{2.5}$, $SrFeO_3$), and the compositions of the films were adjusted by controlling the number of shots irradiated on different targets. The first layer is defined as the layer closest to the YSZ substrate, the second layer is defined as the layer on the first layer, and so on. In addition, each layer of the perovskite crystal films of the present disclosure can also be formed by screen printing, and is not limited to the experimental steps.

The prepared samples were taken out for the following analysis.

<Variable Temperature X-Ray Diffraction>

The crystal structure of each sample was analyzed by X-ray diffraction. During the measurement process, a Cu-Kα radiation with a wavelength of 0.154 nm was used, the scanning angle (2θ) was set from 30° to 32°, the scanning speed was set about 0.03°/sec, and the sample was measured at room temperature, 100° C., 200° C., 300° C., 400° C. and 500° C. (each temperature was maintained for 5 to 10 minutes before the measurement to bring the sample to thermal equilibrium). The change of the pitch of crystal planes can be inferred through the 2θ changes under different temperatures, so as to calculate the linear thermal expansion coefficient of each material. The results are reported in Table 1 below.

TABLE 1

| Layer number | | Material of perovskite crystal films | Linear thermal expansion coefficient |
|---|---|---|---|
| Preparation Example 1 | Second layer | $La_{0.6}Sr_{0.4}Co_{0.6}Fe_{0.4}O_3$ | $18.9 \times 10^{-6}/K$ |
| | First layer | $La_{0.6}Sr_{0.4}Co_{0.4}Fe_{0.6}O_3$ | $14.9 \times 10^{-6}/K$ |
| Preparation Example 2 | Second layer | $La_{0.6}Sr_{0.4}Co_{0.6}Fe_{0.4}O_3$ | $18.9 \times 10^{-6}/K$ |
| | First layer | $La_{0.2}Sr_{0.8}Co_{0.2}Fe_{0.8}O_3$ | $12.5 \times 10^{-6}/K$ |
| Preparation Example 3 | Third layer | $La_{0.6}Sr_{0.4}Co_{0.6}Fe_{0.4}O_3$ | $18.9 \times 10^{-6}/K$ |
| | Second layer | $La_{0.6}Sr_{0.4}Co_{0.4}Fe_{0.6}O_3$ | $14.9 \times 10^{-6}/K$ |
| | First layer | $La_{0.2}Sr_{0.8}Co_{0.2}Fe_{0.8}O_3$ | $12.5 \times 10^{-6}/K$ |
| Preparation Example 4 | Fourth layer | $La_{0.6}Sr_{0.4}Co_{0.6}Fe_{0.4}O_3$ | $18.9 \times 10^{-6}/K$ |
| | Third layer | $La_{0.6}Sr_{0.4}Co_{0.2}Fe_{0.8}O_3$ | $16.5 \times 10^{-6}/K$ |
| | Second layer | $La_{0.6}Sr_{0.4}Co_{0.4}Fe_{0.6}O_3$ | $14.9 \times 10^{-6}/K$ |
| | First layer | $La_{0.2}Sr_{0.8}Co_{0.2}Fe_{0.8}O_3$ | $12.5 \times 10^{-6}/K$ |
| Preparation Example 5 | Fourth layer | $La_{0.6}Sr_{0.4}Co_{0.6}Fe_{0.4}O_3$ | $18.9 \times 10^{-6}/K$ |
| | Third layer | $La_{0.6}Sr_{0.4}Co_{0.4}Fe_{0.6}O_3$ | $14.9 \times 10^{-6}/K$ |
| | Second layer | $La_{0.2}Sr_{0.8}Co_{0.2}Fe_{0.8}O_3$ | $12.5 \times 10^{-6}/K$ |
| | First layer | $La_{0.8}Sr_{0.2}Co_{0.2}Fe_{0.8}O_3$ | $9.92 \times 10^{-6}/K$ |
| Preparation Example 6 | Single layer | $La_{0.6}Sr_{0.4}Co_{0.6}Fe_{0.4}O_3$ | $18.9 \times 10^{-6}/K$ |

As shown in Table 1, the CTE difference ΔCTE of the single-layer cathode structure (Preparation Example 6) reaches 47.6%, based on the first layer of perovskite crystal films and the solid electrolyte layer (YSZ substrate). However, the CTE difference ΔCTE of the four-layer gradient cathode structure (Preparation Example 5) can be reduced to <22%, based on the first layer of perovskite crystal films and the solid electrolyte layer (YSZ substrate).

Moreover, the change rate of the linear thermal expansion coefficients of the two-layer perovskite crystal films of Preparation Example 1 is 21.2% along the direction away from the solid electrolyte layer (thickness direction), and the change rate of the first layer of perovskite crystal films and the electrolyte layer is 33.6%. The change rate of the linear thermal expansion coefficients of the two-layer perovskite crystal films of Preparation Example 2 is 33.9% along the direction away from the solid electrolyte layer (thickness direction), and the change rate of the first layer of perovskite crystal films and the electrolyte layer is 20.8%. The average change rate of the linear thermal expansion coefficients of the three-layer perovskite crystal films of Preparation Example 3 is 18.6% along the direction away from the solid electrolyte layer (thickness direction), and the change rate of the first layer of perovskite crystal films and the electrolyte layer is 20.8%. The average change rate of the linear thermal expansion coefficients of four-layer perovskite crystal films of Preparation Example 4 is 12.8% along the direction away from the solid electrolyte layer (thickness direction), and the change rate of the first layer of perovskite crystal films and the electrolyte layer is 20.8%. The average change rate of the linear thermal expansion coefficients of the four-layer perovskite crystal films of Preparation Example 5 is 19.3% along the direction away from the solid electrolyte layer (thickness direction), and the change rate of the first layer of perovskite crystal films and the electrolyte layer is 0.2%.

PREPARATION EXAMPLES 7-8

Two-layer perovskite crystal films of Table 2 below were prepared on a YSZ substrate in the same manner as in Preparation Example 1, and the double targets used in Preparation Examples 7-8 were "$LaMnO_3$ and $SrMnO_3$" and "$LaFeO_3$ and $SrFeO_3$", respectively. The linear thermal expansion coefficient of each material was then calculated using the same analytical method as in Preparation Example 1. The results are reported in Table 2 below.

TABLE 2

| | Layer number | Material of perovskite crystal films | Linear thermal expansion coefficient |
|---|---|---|---|
| Preparation Example 7 | Second layer | $La_{0.6}Sr_{0.4}MnO_3$ | $12.6 \times 10^{-6}$/K |
| | First layer | $La_{0.8}Sr_{0.2}MnO_3$ | $11.6 \times 10^{-6}$/K |
| Preparation Example 8 | Second layer | $La_{0.5}Sr_{0.5}FeO_3$ | $19 \times 10^{-6}$/K |
| | First layer | $La_{0.8}Sr_{0.2}FeO_3$ | $12.2 \times 10^{-6}$/K |

As show in Table 2, the change rate of the linear thermal expansion coefficients of the two-layer perovskite crystal films of Preparation Example 7 is 7.9% along the direction away from the solid electrolyte layer (thickness direction), and the change rate of the first layer of perovskite crystal films and the electrolyte layer is 14.7%. The change rate of the linear thermal expansion coefficients of the two-layer perovskite crystal films of Preparation Example 8 is 35.8% along the direction away from the solid electrolyte layer (thickness direction), and the change rate of the first layer of perovskite crystal films and the electrolyte layer is 18.9%.

EXPERIMENTAL EXAMPLES 1-7

The samples of Preparation Examples 1-5 and 7-8 were subjected to a thermal cycling from room temperature to 800° C. After five cycles of the thermal cycling, the resistance change rate of the membrane electrode assembly for each cycle is shown in FIG. 5, wherein the resistance change rate (in %) is the resistance value measured by the n-th cycle in the thermal cycling divided by the resistance value measured by the first cycle of the thermal cycling, and then multiplied by 100.

COMPARATIVE EXAMPLE

The sample of Preparation Example 6 was subjected to the above five thermal cycling test. The resistance change rate of the membrane electrode assembly for each cycle is shown in FIG. 5.

Figure 5:
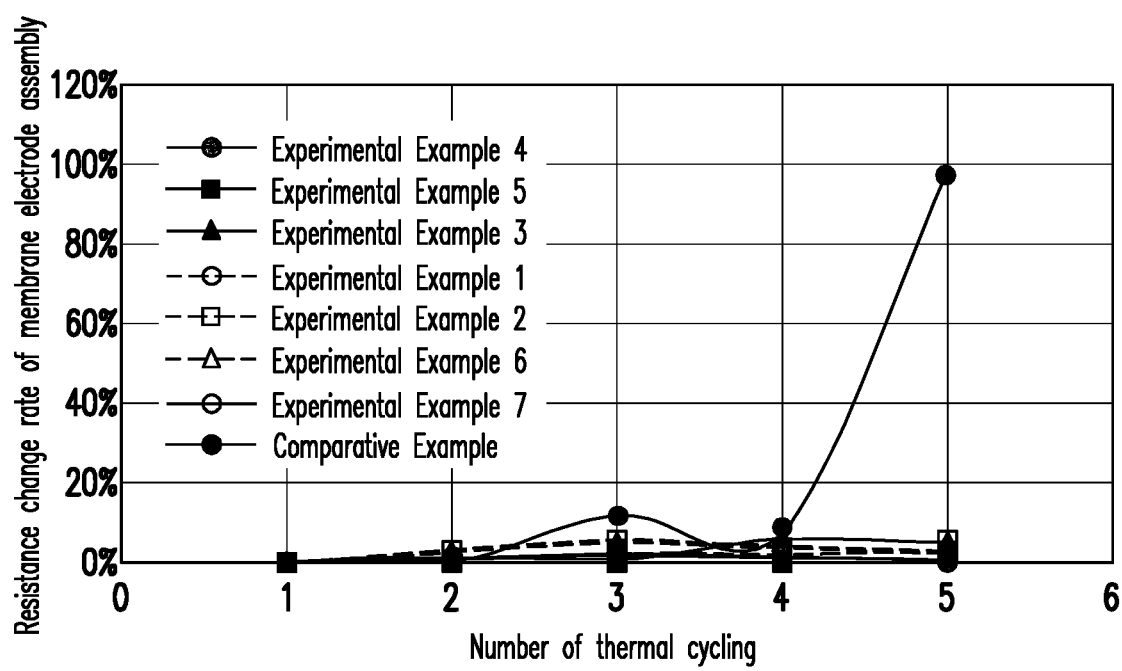
FIG. 5 is a graph showing the resistance values obtained by thermal cycling test of the membrane electrode assemblies of Experimental Examples 1-7 and Comparative Example.

As shown in FIG. 5, the resistance value of the single layer structure of Comparative Example is varied by up to 99%. In comparison, the resistance change rate of each of the two-layer cathode layers of Experimental Examples 1-2 and 6-7 (i.e., Preparation Examples 1-2 and 7-8) is less than 5%, and the resistance change rate of the four-layer cathode layer of Experimental Example 4 (i.e., Preparation Example 4) is less than 1%. It is proved that the present disclosure can greatly reduce the impact of thermal cycling stress on the performance of the solid oxide fuel cell.

In summary, the cathode layer of the present disclosure consists of a plurality of perovskite crystal films with linear thermal expansion coefficients that change in a specific change rate along the thickness direction, so that it has high resistance to thermal shock and can greatly reduce the impact of thermal cycling stress on the performance of the solid oxide fuel cell.

It will be apparent to those skilled in the art that various modifications and variations may be made to the structure of the disclosed embodiments without departing from the scope or spirit of the disclosure. In view of the remaining, it is intended that the disclosure cover modifications and variations of this disclosure provided they fall within the scope of the following claims and their equivalents.

What is claimed is:

1. A cathode layer of a solid oxide fuel cell, characterized in that: the cathode layer consists of a plurality of perovskite crystal films, and an average change rate of linear thermal expansion coefficients of the plurality of perovskite crystal films is 5% to 40% along a thickness direction, and the linear thermal expansion coefficients of the plurality of perovskite crystal films are reduced towards a solid electrolyte layer of the solid oxide fuel cell.

2. The cathode layer of the solid oxide fuel cell as claimed in claim 1, wherein the plurality of perovskite crystal films comprises two to four layers.

3. The cathode layer of the solid oxide fuel cell as claimed in claim 1, wherein a material of the plurality of perovskite crystal films comprises LaSrCoFe oxide, LaSrFe oxide or LaSrMn oxide.

4. The cathode layer of the solid oxide fuel cell as claimed in claim 3, wherein the plurality of perovskite crystal films comprises $La_{1-x}Sr_xCo_{1-y}Fe_yO_3$, wherein $0.1 \leq x \leq 0.9$ and $0.3 \leq y \leq 1.0$.

5. The cathode layer of the solid oxide fuel cell as claimed in claim 3, wherein the plurality of perovskite crystal films comprises $La_{1-w}Sr_wFeO_3$, wherein $0.1 \leq w \leq 0.5$.

6. The cathode layer of the solid oxide fuel cell as claimed in claim 3, wherein the plurality of perovskite crystal films comprises $La_{1-z}Sr_zMnO_3$, wherein $0.1 \leq z \leq 0.5$.

7. The cathode layer of the solid oxide fuel cell as claimed in claim 1, wherein along the thickness direction of the plurality of perovskite crystal films, a linear thermal expansion coefficient of an uppermost layer is $1.2 \times 10^{-5}$/K to $2 \times 10^{-5}$/K, and a linear thermal expansion coefficient of a lowermost layer is $9 \times 10^{-6}$/K to $1.5 \times 10^{-5}$/K.

8. The cathode layer of the solid oxide fuel cell as claimed in claim 7, wherein the plurality of perovskite crystal films comprises three layers, and a difference in linear thermal expansion coefficients between two adjacent layers is $2 \times 10^{-6}$/K to $5 \times 10^{-6}$/K.

9. The cathode layer of the solid oxide fuel cell as claimed in claim 7, wherein the plurality of perovskite crystal films comprises four layers, and a difference in linear thermal expansion coefficients between two adjacent layers is $1 \times 10^{-6}$/K to $4.5 \times 10^{-6}$/K.

10. The cathode layer of the solid oxide fuel cell as claimed in claim 1, wherein a porosity of the plurality of perovskite crystal films is substantially the same.

11. A membrane electrode assembly of a solid oxide fuel cell, comprising:
a cathode layer as claimed in claim 1;
an anode layer; and
a solid electrolyte layer, disposed between the cathode layer and the anode layer,
wherein the linear thermal expansion coefficients of the plurality of perovskite crystal films in the cathode layer are reduced towards the solid electrolyte layer.

12. The membrane electrode assembly of the solid oxide fuel cell as claimed in claim 11, wherein the plurality of perovskite crystal films comprises two to four layers.

13. The membrane electrode assembly of the solid oxide fuel cell as claimed in claim 11, wherein a material of the perovskite crystal film comprises LaSrCoFe oxide, LaSrFe oxide or LaSrMn oxide.

14. The membrane electrode assembly of the solid oxide fuel cell as claimed in claim 13, wherein the plurality of perovskite crystal films comprises $La_{1-x}Sr_xCo_{1-y}Fe_yO_3$, wherein $0.1 \leq x \leq 0.9$ and $0.3 \leq y \leq 1.0$.

15. The membrane electrode assembly of the solid oxide fuel cell as claimed in claim 13, wherein the plurality of perovskite crystal films comprises $La_{1-w}Sr_wFeO_3$, wherein $0.1 \leq w \leq 0.5$.

16. The membrane electrode assembly of the solid oxide fuel cell as claimed in claim 13, wherein the plurality of perovskite crystal films comprises $La_{1-z}Sr_zMnO_3$, wherein $0.1 \leq z \leq 0.5$.

17. The membrane electrode assembly of the solid oxide fuel cell as claimed in claim 11, wherein in the plurality of perovskite crystal films, a linear thermal expansion coefficient of an outermost layer is $1.2 \times 10^{-5}$/K to $2 \times 10^{-5}$/K, and a linear thermal expansion coefficient of an innermost layer is $9 \times 10^{-6}$/K to $1.5 \times 10^{-5}$/K.

18. The membrane electrode assembly of the solid oxide fuel cell as claimed in claim 11, wherein a material of the solid electrolyte layer comprises $ZrO_2$, $CeO_2$, $Bi_2O_3$, $La(Sr)Ga(Mg)O_3$ or a combination thereof.

19. The membrane electrode assembly of the solid oxide fuel cell as claimed in claim 18, wherein a material of the anode layer comprises nickel oxide and at least one of the material of the solid electrolyte layer.

20. The membrane electrode assembly of the solid oxide fuel cell as claimed in claim 11, wherein the cathode layer is in direct contact with the solid electrolyte layer.

\* \* \* \* \*